Nov. 30, 1937.    E. B. THOMPSON    2,100,617
AUTOMOBILE LIFT
Filed Dec. 28, 1936
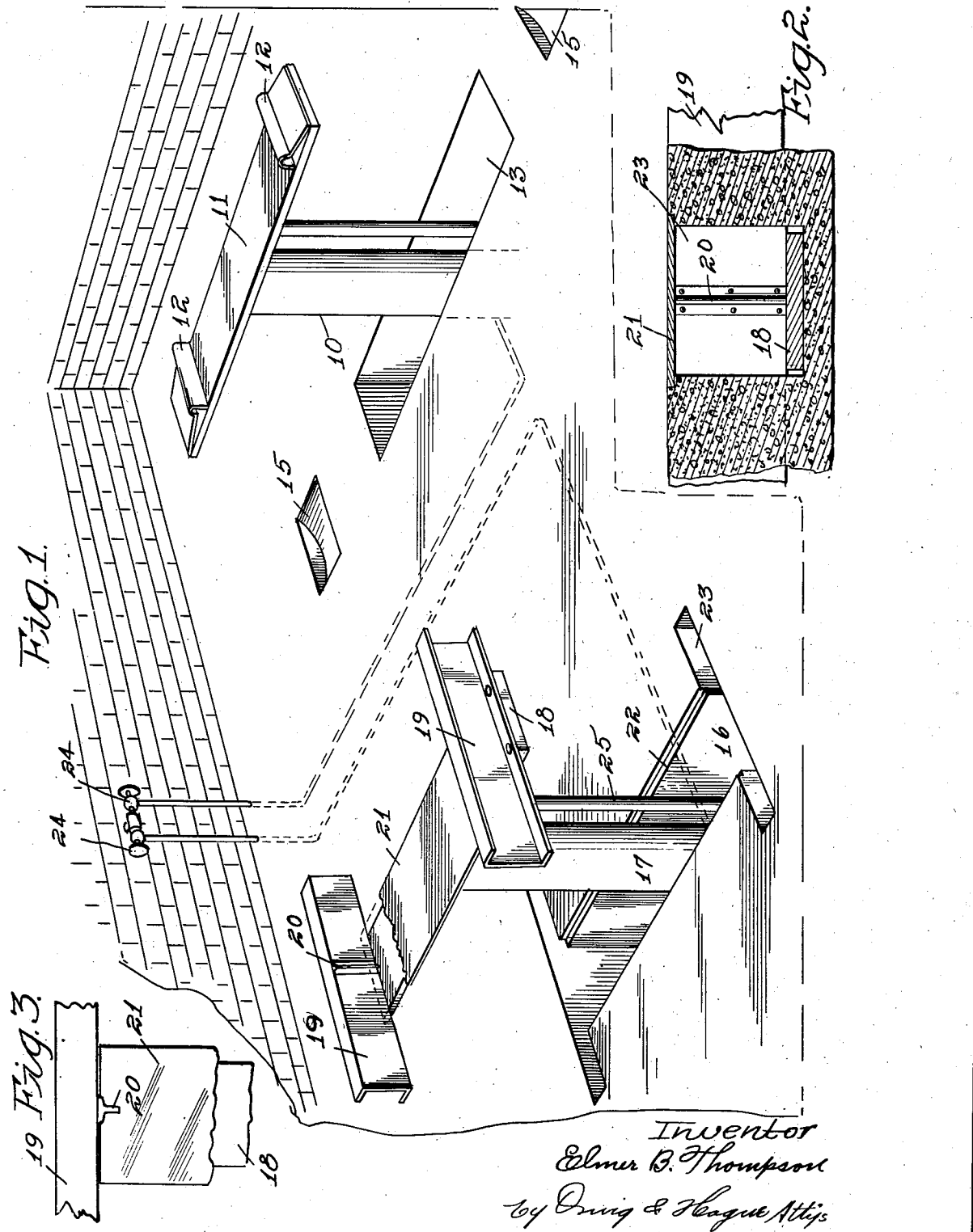
Inventor
Elmer B. Thompson
by Owing & Hague, Attys Patented Nov. 30, 1937

2,100,617

UNITED STATES PATENT OFFICE 2,100,617

AUTOMOBILE LIFT

Elmer B. Thompson, Des Moines, Iowa, assignor to Globe Machinery & Supply Company, Des Moines, Iowa, a corporation of Iowa Application December 28, 1936, Serial No. 117,680

1 Claim. (Cl. 254—89)

My invention is specially designed for use in automobile repair shops or places in which it is desirable to have the entire lift normally contained beneath the floor surface and covered to permit the free and unobstructed use of the floor and yet ready for immediate use as an automobile lift.

My object is to provide a lift of this character of simple and inexpensive construction and a minimum of working parts, and in which the floor openings are automatically closed when the lift is lowered and the floor forming portions of the lift automatically moved to positions where they will not be in the way of an operator when the lift is lowered.

A further object is to provide a lift of this class adapted for use with automobiles of different wheel bases without adjusting any parts of the lift and in which the use of rear axle supporting jacks is rendered unnecessary.

In the accompanying drawing Figure 1 shows a perspective view of my improved lift mounted beneath the floor surface shown in its elevated position.

Figure 2 is a transverse sectional view through the rear transverse beam and floor plate, with the floor plate in position flush with the adjacent floor surface.

Figure 3 shows a detail plan view illustrating the guide device for holding the floor plate in position relative to the rear axle supporting member.

Referring to the accompanying drawing I have used the reference numeral 10 to indicate a hydraulic automobile lift cylinder of the kind in general use. I have referred to this cylinder in general terms as a "lifting member" but do not desire to be understood as limiting my invention to the specific kind of lifting member employed.

Fixed to the top of the cylinder 10 is a front axle supporting member 11 which may, if desired, be provided near its end with raised axle engaging ribs 12 slightly spaced above the body of the beam. This automobile lifting member is mounted in a pit 13 formed in the floor surface 14, and the opening at the top of the pit is of such size and shape that when the front axle engaging member is at its lower limit of movement it will be substantially flush with the top of the floor 14 to thereby form a floor member. At the sides of the pit 14 I preferably provide two automobile wheel receiving depressions 15 which are so positioned relative to the pit 13 that when the front wheels of an automobile are positioned in said pits the front axle will be properly spaced above the front axle engaging beam.

At the rear of the pit 13 there is a second pit 16, and in this pit there is mounted a hydraulic cylinder 17 or other automobile lifting member. At the top of the lifting member 17 is a transverse beam 18, and on the end portions of the transverse beam 18 are two longitudinally arranged channel bars 19 forming rear axle engaging members, the top surfaces of which are relatively broad and flat to form floor members, and said top surfaces are spaced apart from the transverse beam 18 far enough so that when a rear axle is engaged by the bars 19, the differential housing of the rear axle will be spaced above the transverse beam 18. The length of the bars 19 is such that, when a front axle of an automobile is supported on the front axle engaging member, then the rear axle will be engaged by the bars 19, regardless of the length of the automobile between axles, that is to say, of the various standard sizes of automobiles in common use. By this arrangement it is unnecessary to employ jacks for the rear axle engaging beams, such as are commonly employed, to hold the rear axle far enough above the remainder of the structure so that the differential housing will not be engaged by the structure.

Fixed to the inner faces of the beams 19 are the guide members 20, and resting on top of the transverse beam 18 is a floor member 21 having notches in its ends to receive the guides 20.

In the floor, at the edges of the pit 16 I have formed shoulders at 22, and at the ends of the pit 16 there are pit members 23 of approximately the sizes and shapes of the beams 18 so that when the beams are lowered, the top surfaces of the beams will form floor members flush with the floor, and when the lift is being lowered, the front and rear edges of the floor plate 21 will engage the shoulders 22 and thereby hold the floor member 21 from downward movement below the floor surface during the time when the lift is being lowered to position with the upper surfaces of the beam 19 flush with the floor. When the lift is fully lowered, the floor plate 21 and the upper surfaces of the beams 19 are all substantially flush with the floor surface and completely close the pit, and this makes it unnecessary to employ any manually operable doors or floor members for the rear pit.

In the drawing I have illustrated two control valves 24 for controlling the admission of fluid under pressure to the lifting cylinders.

In order to prevent the rotation of the cylinders 10 and 17 when elevated I preferably provide a guy rod 25 fixed to the beam on top of the cylinder and having its lower end movable up and down through an opening in the pit.

In practical operation and when both of the cylinders are in their lowered positions, the entire floor surface is covered and closed and usable as a shop without interfering with the use of the floor for such purpose. When it is desired to lift an automobile the front wheels are run into the depressions 16 and then the valves 24 are operated to simultaneously raise the hydraulic cylinder. The upper surfaces of the beams 19 move upwardly past the floor plate 21, which remains stationary until the beams 19 have engaged the rear axle of the automobile, and when this occurs the differential housing of the rear axle is supported above the floor plate 21.

With my improved jack, when in an elevated position, the operator has free access to practically all of the under surface of an automobile and the automobile is firmly and securely supported in its elevated position.

I claim as my invention:

In an automobile lift, the combination of a lifting member, a transverse beam mounted thereon, two automobile axle engaging beams fixed to the transverse beam and arranged longitudinally and having wide, flat upper surfaces to serve as floor members when in a lowered position, a floor plate mounted upon said transverse beam and extending from one of said axle engaging beams to the other and movable vertically relative to the transverse beam, said plate being formed with vertical notches in its ends, vertical ribs on the inner side of said axle engaging beams to enter said notches for guiding the floor plate in its vertical movement, portions of said floor plate being projected laterally beyond the transverse beam, and a floor formed with openings to receive the beams with the top surfaces of the axle engaging beams flush with the top of the floor, said floor being also formed with shoulders positioned to engage the side edges of the floor plate and support it in position with its top surface flush with the floor.

ELMER B. THOMPSON.